United States Patent [19]

Keough et al.

[11] Patent Number: 5,385,602
[45] Date of Patent: Jan. 31, 1995

[54] AGGLOMERATING BY EXTRUSION

[75] Inventors: William J. Keough, Toronto; Gregory J. Saunders, Sudbury; Neil L. Smith, Oakville; Mark Stratychuk, Don Mills, all of Canada

[73] Assignee: Southwind Enterprises Inc., Sudbury, Canada

[21] Appl. No.: 50,790

[22] Filed: Apr. 22, 1993

[51] Int. Cl.$^6$ .................................... C22B 1/243
[52] U.S. Cl. ........................... 75/766; 75/768; 75/771; 75/773
[58] Field of Search .................. 75/766, 768, 771, 773

[56] References Cited

U.S. PATENT DOCUMENTS

| | | |
|---|---|---|
| 4,802,919 | 2/1989 | Fey . |
| 5,100,464 | 3/1992 | Kelly et al. . |
| 5,104,446 | 4/1992 | Keough et al. ........... 75/771 |

FOREIGN PATENT DOCUMENTS 1283296 of 0000 Canada .

*Primary Examiner*—Melvyn J. Andrews
*Attorney, Agent, or Firm*—Bereskin & Parr

[57] ABSTRACT

A process for agglomerating by extrusion, metallurgical by-products and waste products having small particle size, is described. A blend of metallurgical by-products, some of which contain silicates previously treated at high temperatures and thereby being capable of chemically and structurally binding water, optionally mixed with portland cement and/or slag cement, and containing water which has been added in amounts that the silicates and cement present can completely absorb and react with, is further mixed with a hydrocarbonaceous substance. The resulting mixture is subsequently agglomerated by extrusion. The extrudates obtained are shape retaining and sufficiently hard to be handled without breaking, crumbling or dusting, and may be charged to extractive pyrometallurgical installations for recovering value metals contained in the metallurgical by-products and waste products. The extrudates may also be stored without dusting and loss of hardness.

7 Claims, No Drawings

AGGLOMERATING BY EXTRUSION

FIELD OF THE INVENTION

This invention relates to agglomerating small particles, more particularly agglomerating by extrusion small particles which are the by-products of the metallurgical industry.

By-products and waste products found in the metallurgical industry often contain value metals in concentrations which could be economically recovered. To effect metal recovery, the by-products and waste materials are usually fed to various stages of the high temperature extractive process designed to produce pure metal or alloy. The operation of most of the high temperature extractive installations is accompanied by a strong upward draft. The waste and the by-products are most commonly in the form of dust or very small particles, thus feeding them in this form to be processed in high temperature furnaces and similar installations would result in the particles being blown out into the surrounding atmosphere. Furthermore, the dust in the atmosphere would also lead to environmental hazards. It is thus an obvious requirement that the waste and by-products to be treated for recovery by recycling to the furnaces be agglomerated. It is also a requirement for obvious economic considerations, that the operation of the agglomerating process and the binders utilized in the agglomerating process, be as inexpensive as it is possible under the circumstances.

Cement has been used by several conventional processes as a binder, but the resulting agglomerates often take the shape of large pieces which need to be broken up, thereby creating more dust. Another disadvantage of cement being used as a sole agglomerating agent is that additional fuel is needed to heat and melt the cement added as a binder, so that it may be incorporated into the slag phase. In some other conventional processes, resins and other carbohydrates have been combined with cement in agglomerating metallurgical by-products. For example, Canadian patent 1,283,296 issued to Alanko and Atwell, describes a process for obtaining briquettes composed of sand and similar reducible oxides, a solid reducing agent, and a mixed binder system, the latter comprising an organic or inorganic compound containing liquid and coal tar pitch or similar carbonaceous material. The agglomerates of Canadian Patent 1,283,296 are obtained by conventional briquetting, followed by drying and heat treatment. Most conventional briquetting processes require the application of high pressure and a post heat treatment to obtain agglomerates, hence they are relatively expensive for the treatment of waste and by-products.

It is to be noted that the recycling of metallurgical by-products to various furnaces for recovering value metals contained in the waste and/or by-product may not need agglomerates having high impact resistance. Often the requirement is merely that the agglomerates may be handled and added to the furnace without crumbling; in other words, the agglomerates have to retain their shape and withstand handling and wear without dust generation before they enter into the melt.

SUMMARY OF THE INVENTION

It has been found that metallurgical by-products often contain silicates which have cementitious properties. It has also been found that small amounts of slag cement, portland cement or similar compounds having cementitious properties, added to waste products containing metal oxides may serve as a binding agent. It has been further found, that if a hydrocarbonaceous binder is also added to this mixture, it may be extruded and the extrudates obtained will retain their shape, and their strength will increase on standing. The extrudates obtained may be charged to furnaces for metal recovery and similar installations, without further heat treatment.

It is the object of the present invention to utilize the cementitious properties of metallurgical by-products in obtaining agglomerates. It is a further object of the present invention to utilize the interactive effects of applying cement and hydrocarbons for extruding the mixture comprising metallurgical by-and waste products. It is yet another object of the present invention to obtain by extrusion agglomerates which retain their shape and may be charged to high temperature installations without having to be subjected to further heat treatment.

A new method has been found for producing extrudates containing at least one metallurgical by-product comprising the steps of:

a) preparing a first mixture comprising a metallurgical by-product, said metallurgical by-product containing at least one member of the group consisting of ferrous metal and compounds, non-ferrous transition metals and compounds, and precious metals; a silicate-bearing compound capable of chemically reacting with water, and water added in an amount which is chemically required to react with said silicate-bearing compound;

b) melting a hydrocarbonaceous substance having a melting temperature less than 200° C. and adding the molten hydrocarbonaceous substance to said first mixture in an amount which does not exceed said silicate-bearing compound present in said first mixture;

c) mixing said molten hydrocarbonaceous substance with said first mixture obtained in step (a) to obtain a second mixture; and d) extruding said second mixture for obtaining extrudates.

The silicate-bearing compound capable of chemically reacting with water may be contained in one of the metallurgical by-products comprised in the mixture, or may be added in the form of slag cement or portland cement, or both.

The water added to the mixture is completely absorbed or consumed by chemical reaction, thus the mixture is dry to the touch before it is mixed with the melted hydrocarbon.

The preferred embodiments of the present invention will be discussed hereinbelow and illustrated by examples.

DETAILED DESCRIPTION OF THE INVENTION

Metallurgical by-products or waste products often take the shape of dust and small sized particles. Such products may originate in mineral processing, as well as in spillage of melts, residues left in ladles, furnaces and converters, dust collected by electrostatic precipitators and fume hoods, such as Cottrell dust, and the like. The dust and small particles may be the result of crushing furnace lining bricks. The residual concentration of value metals in the by-products listed above may justify their return to extractive process steps for further treatment.

Slime collected in electrorefining, electrowinning or electroplating processes may also contain value metals, and hence be considered worth recycling. Dross, slag, ash and other metal-rich waste products may also carry small particles of reclaimable metals. Small particles of oxide originating in milling and similar waste material obtained during the working of metallic items, such as turnings and scarf, may also be mixed with other by-products to be recycled to metal extractive installations, usually converters and furnaces of this nature.

It is usual that several metallurgical by-products of different origin are mixed to be recycled for further extractive treatment. Irrespective of their origin, the particles of metallurgical by-products and waste products which are to be recycled to furnaces will be referred to in the discussion that follows, as metallurgical dust.

Some metallurgical by-products may not be intended to be recycled to high temperature extraction process steps. In such instances the metallurgical by-product is often stored out of doors, in dump heaps, or some times used as mine-backfill. Due to the small particle size and dusty nature of by-products and some waste products, these may be considered environmentally objectionable. It has been found that the present process can be utilized for agglomerating by extrusion metallurgical by-products and waste products to eliminate environmentally hazardous dust generation in storage.

Some metallurgical dust which is to be recycled may contain silicates which have undergone previous pyrometallurgical treatment. Such metallurgical by-product is for instance, Cottrell dust. Silicates of this nature are usually capable of chemically reacting with water, and absorbing the water in such a manner that the water becomes structurally bound to the silicates. Water being structurally bound to the constituents of the metallurgical dust is indicated by the dust remaining dry to the touch after a given amount of water has been mixed with it. In other words, the water added will be completely absorbed by the metallurgical dust which contains silicates capable of chemically reacting with water. The amount of water a dust is capable of completely absorbing will depend on the composition of the dust and what heat treatment it has been previously subjected to. The notable effect of the water being chemically bound to the silicates contained in the metallurgical dust, is that such silicates harden and the dust will agglomerate into shapes which will withstand handling. The hardened silicates will render the agglomerates handleable without breaking up or crumbling into dust.

As discussed above, the metallurgical dust which is to be recycled to metal extractive processes, is usually a mixture of by-products and waste products obtained in various metallurgical processes. Hence, the composition and the portion of silicates therein capable of chemically reacting with water, will vary. In order to obtain agglomerates of metallurgical dust that are handleable without crumbling and retain their shape without breaking, it was found to be of advantage to admix portland cement or slag cement, or both, with the dust. The added portland cement or slag cement, or a mixture of such cements, thereby supplements the cementitious properties of the silicates already present in the dust. It was found that the preferred amount of cement optionally added to the dust ranged between 4 to 16 weight percent, depending on the nature and origin of the metallurgical dust to be treated.

A further advantage of adding a known quantity of portland and/or slag cement to the metallurgical dust, is that the amount of water the mixture is thus capable of chemically reacting with, is more readily assessed. In other words, the water that the mixture can absorb, that is capable of structurally binding, may thus be more readily estimated. It was found that in the preferred embodiment of practising the invention, the amount of water the dust and cement mixture will absorb while the mixture will still appear dry to the touch, is twice the weight percent of cement added in the mixture, plus 3–5 weight percent for allowing the silicate inherently present in the metallurgical dust, to chemically react with water. If water is added in amounts which are defined by the above range, it will be completely chemically absorbed by the mixture and react with it. In other words, the water added to the mixture will not form a separate liquid phase within the mixture.

It has been found as mentioned previously, that agglomerating metallurgical dust with cement addition alone may not eliminate all the difficulties associated with recycling dust to furnaces. If the cement exceeds the optimum amount required, the agglomerates will be too hard and may need to be broken up to small particles before being charged to the furnace, thus leading to more dust formation. Moreover, the presence of cement requires more fuel to keep the melt in the furnace or the converter at the required temperature, thus for economic considerations the amount of cement added should be kept at a low value. However, if the amount of cement is below that required, the agglomerates will not have structural integrity, may fall apart during charging to the furnace, resulting in dust formation and so on.

It has surprisingly been found, that if a hydrocarbonaceous compound is added in sufficient amounts to the mixture of metallurgical dust and cement containing chemically bound water which has been previously added, the resulting mixture will be readily agglomerated by extrusion. The obtained extrudates will retain their shapes, will not crumble or dust, and may be charged directly to a pyrometallurgical installation. Moreover, the strengths of such extrudates will increase with time.

The amount of hydrocarbonaceous compound required for obtaining extrudates having desired properties, is usually less than the weight percent of the cement present in the mixture, and it is preferably about half of the cement added.

The hydrocarbonaceous compound utilized in the present process is preferably a hydrocarbon wax which has melting temperature above the ambient but does not exceed 200° C. Other relatively low melting hydrocarbons, such as asphalt, bitumen, tar pitch and the like, may also be used.

It is preferred that the wax or similar hydrocarbonaceous compound is melted or is in a fluid state, before it is admixed with the mixture containing metallurgical dust, cement and water which has been absorbed by the mixture. For the sake of clarity, a hydrocarbonaceous substance is usually understood to be a long chained organic compound essentially composed of carbon and hydrogen.

As stated above, in the preferred embodiment, the agglomerates containing metallurgical dust to be recycled are obtained by extrusion. Conventional extruders may be utilized having usual shaped opening or openings at the exit end of the extruder. The mixture is extruded by means of a screw conveyor or similar auger. The extruding pressure applied is well below 800 psi, and is preferably in the range of 450–500 psi. The extrudates have a cross-section defined by the exit diameter of the extruder, but the length of the extrudates is irregular. In most cases, the ratio of the length of the extrudate to its cross-section is at least 2:1.

It is a characteristic feature of extrusion that the extruding pressure is applied to urge the substance to be extruded towards the exit end of the extruder and thereby obtain extrudates. The extrusion is usually but not necessarily conducted in an apparatus having a horizontal shaft.

It is to be noted that most conventional metallurgical agglomeration utilizes briquetting. Agglomeration by briquetting, as being distinct from extruding, is usually carried out between two pocketed rollers each of which rotates around a separate horizontal axis. The briquettes are obtained between the faces of the pockets, by applying pressure of 1,500–3,000 psi to each half of the pockets. The substance to be briquetted does not move while the briquetting pressure is applied. The regularly shaped green briquettes undergo further drying, induration and firing, to attain the high impact strength required by conventional processes utilizing briquettes.

Extrusion may be continuous or intermittent. The extrudates are obtained at ambient temperature in the present process. The extrudates obtained as described herein above, do not require further heat treatment and may be charged directly to a furnace for the recovery of value metals contained in the extrudates. Alternatively, the extrudates may be stored before they are put to use. The extrudates are unlikely to lose their desirable properties in storage, there may even be further improvement in their impact strength.

Further drying or induration may be applied to extrudates obtained, however this is not a requirement.

In another embodiment of this process, suction may be applied within the shaft during extrusion to release air adsorbed on the surface of the particles to be agglomerated. The application of heat during the extrusion is not a requirement of this process.

The metallurgical dust to be recycled and treated according to the present process may comprise various iron oxides or similar iron compounds, oxides or compounds of non-ferrous transition metals and precious metals. Metals which are considered to fall in the broad category of non-ferrous transition metals are: nickel, copper, cobalt, vanadium, chromium, titanium, manganese, molybdenum, zinc, tantalum, tungsten, aluminum and the like. The term precious metals in the present case are considered to include the following metals: silver, gold, platinum, iridium, rhenium, rhodium, palladium, ruthenium and so on.

It may be concluded from the foregoing that the mixture to be extruded comprises a metallurgical dust as defined above, optionally portland and/or slag cement, water chemically bound in the mixture and a hydrocarbonaceous compound. If the weight percent of metallurgical dust in the mixture is denoted as Md, and the weight percent of cement comprised in the mixture to be agglomerated is denoted as C, the weight percent of water in the mixture is denoted as $H_2O$, and the weight percent of the hydrocarbonaceous substance is denoted as W, then for best results, the mixture is made up within the following composition ranges:

$$60 \leq Md + C \leq 95$$
$$H_2O \leq 2C + 5$$
$$W < C$$

The blended mixture, having the broad composition range as indicated above, is subsequently extruded. The extrudates obtained pass a free fall test without breaking, will not crumble into dust and may be added to be treated in an extractive metallurgical operation without generating dust.

It has been found that a particular advantage of utilizing the above described mixture and agglomerating the mixture by extrusion, is that the silicates present in the mixture and the hydrocarbon wax interact advantageously. It was found that the silicates inherently contained in the metallurgical dust and supplemented by cement admixed with the dust, having reacted with the water added to the mixture, act together in the presence of wax during extrusion to form an extrudate which is shape retaining without dust generation while setting.

A further advantage of the present process is that the hydrocarbonaceous substance provides additional fuel and heat to allow the processing of recycled dust and cement in the extrudates.

Moreover, the cost of the hydrocarbonaceous compound and the cement is relatively low compared to other conventional binding agents. Extrusion is considered to be one of the least expensive methods for agglomeration. Since the concentration of value metals in waste and by-products is usually relatively low, economic considerations regarding their treatment weigh heavily in selecting the least expensive route to obtain the desired agglomerates.

As it was briefly discussed above, the present process for obtaining extrudates bearing metallurgical dust, may be operated with the application of heat necessary only to fluidize the hydrocarbonaceous substance prior to the substance being admixed in the metallurgical dust containing mixture. The hydrocarbonaceous substance may also be added in a finely divided form, without application of heat, as long as care is taken that the hydrocarbonaceous substance is well dispersed within the mixture before the mixture is extruded by conventional means.

In wintry conditions, when the ambient temperature is below freezing, it may be necessary to heat the metallurgical dust and the cement to a temperature above freezing before the required amount of water is added.

Under conditions at the other end of the temperature scale, if the metallurgical dust is hot, it may be advantageous to allow its temperature to drop below the boiling point of water, before the required amount of water is added to the dust for obvious reasons.

In some instances, the metallurgical by-product has uneven size and the average size may need to be reduced to below one quarter of an inch before the treatment according to the present invention is to be applied to the by-product.

If the metallurgical by-product happens to be wet, it may be of advantage to allow it to dry before subjecting it to the process steps described hereinabove, but this depends on other additives and on the effects of initially unbound water on their respective behaviour.

Yet another advantage of the process for obtaining extrudates bearing metallurgical dust as described hereinabove, is that the presence of a hydrocarbonaceous substance in the mixture appears to add plasticity to the otherwise inelastic behaviour of a cement containing mixture, thereby aiding the extrusion process and diminishing the pressure required to obtain extrudates.

EXAMPLE

A mixture of metallurgical by-products containing calcined, nickel oxide, cobalt oxide and other metal oxides, was to be agglomerated to be charged to a converter for recovering residual nickel and cobalt values in the by-product. The particle size was small; 90% of the by-product was smaller than 1/32 of an inch.

60 lbs of the above metallurgical dust was thoroughly mixed with 9 lbs of slag cement to yield a free-flowing mixture. 20 lbs of water was added to and mixed with the free flowing mixture of metallurgical dust and cement. The mixture obtained after water addition was slightly lumpy, that is it was no longer free flowing, but it was substantially dry to the touch and water could not be made to separate out of the mixture as a liquid.

A hydrocarbon wax, produced by Esso Ltd. and having a melting point of about 140° F. (60° C.) was melted over a water bath and 5 lbs of the molten wax was thoroughly mixed with the above mixture, then charged to a conventional extruder to be extruded.

The extruding pressure was 450–500 psi. The extrudates obtained were of 1.5 inch diameter, and their length varied between 3 to 6 inches.

The extrudates could be handled without dusting, crumbling or breaking into small particles.

After 1 hour the extrudates could be stockpiled, and within 24 hours of having been extruded the extrudates were sufficiently hard and crush resistant to be handled by conventional heavy loading equipment.

It may be seen that the products of the present process yielded metallurgical dust agglomerates which eliminated any dust formation when charged to a furnace.

Although the present invention has been described with reference to the preferred embodiment, it is to be understood that modifications and variations may be resorted to without departing from the spirit and scope of invention as those skilled in the art will readily understand. Such modifications and variations are considered to be within the purview and scope of the invention and the appended claims.

We claim:

1. A method of producing extrudates containing a metallurgical by-product comprising the steps of:

(a) Preparing a first mixture comprising a metallurgical by-product, said metallurgical by-product containing at least one member selected from the group consisting of ferrous metal and compounds, non-ferrous transition metals and compounds and precious metals; a silicate-bearing compound capable of chemically reacting with water and water added in an amount which is required to chemically react with said silicate-bearing compound;

(b) Melting a hydrocarbonaceous substance having a melting temperature less than 200° C. and adding the molten hydrocarbonaceous substance to the first mixture obtained in step (a), in an amount expressed in weight percent which does not exceed said silicate-bearing compound present in said first mixture, and mixing said molten hydrocarbonaceous substance with said first mixture to obtain a second mixture; and (c) Extruding said second mixture for obtaining extrudates.

2. A process according to claim 1, wherein the silicate-bearing compound capable of chemically reacting with water is present in said metallurgical by-product.

3. A method according to claim 1, wherein said silicate-bearing compound capable of chemically reacting with water is selected from the group consisting of portland cement and slag cement.

4. A method according to claim 1, wherein a first portion of the silicate-bearing compound capable of chemically reacting with water is present in said metallurgical by-product, and a second portion of said silicate-bearing compound capable of chemically reacting with water is added to form said first mixture and said second portion is selected from the group consisting of portland cement and slag cement.

5. A method according to claim 1, wherein said hydrocarbonaceous substance is selected from the group consisting of: hydrocarbon wax, bitumen, pitch, asphalt and tar.

6. A method according to claim 1, wherein said silicate-bearing compound capable of reacting with water is present in said first mixture in 5–25 weight percent.

7. A method according to claim 1, wherein said hydrocarbonaceous substance is added to make up said second mixture in an amount less than 14 weight percent.

* * * * *